(12) United States Patent
Ishibashi (10) Patent No.: US 12,316,976 B2
(45) Date of Patent: May 27, 2025

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Tomohiko Ishibashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 18/466,916

(22) Filed: Sep. 14, 2023

(65) Prior Publication Data

US 2024/0147077 A1 May 2, 2024

(30) Foreign Application Priority Data

Nov. 2, 2022 (JP) .................................. 2022-176343

(51) Int. Cl.
*H04N 23/71* (2023.01)
*H04N 5/265* (2006.01)
*H04N 23/75* (2023.01)

(52) U.S. Cl.
CPC ............. *H04N 23/71* (2023.01); *H04N 5/265* (2013.01); *H04N 23/75* (2023.01)

(58) Field of Classification Search
CPC ........ H04N 23/71; H04N 5/265; H04N 23/75; H04N 23/60
See application file for complete search history.

(56) References Cited

U.S. PATENT DOCUMENTS

| | | | |
|---|---|---|---|
| 2009/0141027 A1* | 6/2009 | Sato | G06T 15/60 |
| | | | 345/426 |
| 2016/0231582 A1 | 8/2016 | Yamaguchi | |
| 2021/0195080 A1* | 6/2021 | Kobuse | H04N 23/71 |
| 2021/0233270 A1* | 7/2021 | Ishida | G06V 10/60 |
| 2021/0266444 A1* | 8/2021 | Kitamura | H04N 5/772 |
| 2021/0280618 A1* | 9/2021 | Yamashita | H10F 39/806 |
| 2022/0172388 A1* | 6/2022 | Ishimatsu | G06T 7/11 |
| 2024/0147080 A1* | 5/2024 | Nabeshima | H04N 23/667 |

FOREIGN PATENT DOCUMENTS

JP 2016145924 A 8/2016
JP 2021097347 A 6/2021

* cited by examiner

*Primary Examiner* — Shahbaz Nazrul
(74) *Attorney, Agent, or Firm* — ROSSI, KIMMS & McDOWELL LLP (57) ABSTRACT

An image processing apparatus includes a memory storing instructions, and a processor configured to execute the instructions to acquire first image information acquired by imaging using a polarization element configured to transmit lights with a plurality of polarization azimuths that are different from each other, determine whether a luminance of at least part of the first image information becomes higher than a threshold, and acquire polarization information using the first image information and a determination result. A predetermined condition is satisfied.

17 Claims, 6 Drawing Sheets

IMAGE PROCESSING APPARATUS, IMAGE PICKUP APPARATUS, IMAGE PROCESSING METHOD, AND STORAGE MEDIUM

BACKGROUND

Technical Field

One of the aspects of the embodiments relates to an image processing apparatus, an image pickup apparatus, an image processing method, and a storage medium.

Description of Related Art

In order to obtain polarization information indicating the polarization azimuth, intensity, and intensity of a nonpolarized light component of light from an object, a polarization image sensor has conventionally been known which has a polarizer placed on a specific pixel among the plurality of light receiving elements of the image sensor and a plurality of transmission polarization azimuths (directions or angles). Japanese Patent Laid-Open No. 2016-145924 discloses a method of acquiring a plurality of captured images with different polarization states by changing a phase difference which a variable retardation plate gives light rays, in imaging via a polarization element that includes a retardation plate (quarter waveplate), the variable retardation plate (liquid crystal), and a polarizing plate. Japanese Patent Laid-Open No. 2021-97347 discloses a method of acquiring polarization information by correcting the luminance in a case where the acquired luminance is saturated in imaging via a polarization image sensor.

The methods disclosed in Japanese Patent Laid-Open Nos. 2016-145924 and 2021-97347 may have difficulties in acquiring polarization information.

SUMMARY

An image processing apparatus according to one aspect of the embodiment includes a memory storing instructions, and a processor configured to execute the instructions to acquire first image information acquired by imaging using a polarization element configured to transmit lights with a plurality of polarization azimuths that are different from each other, determine whether a luminance of at least part of the first image information becomes higher than a threshold, and acquire polarization information using the first image information and a determination result. The following inequality is satisfied:

$$1.05 \leq t470/t600$$

where t470 [degrees] and t600 [degrees] are polarization azimuths of the polarization element corresponding to light with a wavelength of 470 nm and light with a wavelength of 600 nm, respectively. Alternatively, in a case where it is determined that the luminance is higher than the threshold, the processor may set the intensities of a polarized light component and a nonpolarized light component of the polarization information to predetermined values or acquire the polarization information from the first image and a third image acquired by imaging under an imaging condition different from that of the first image. An image pickup apparatus having each image processing apparatus also constitutes another aspect of the embodiment. An image pickup method corresponding to each image processing apparatus also constitutes another aspect of the embodiment. A storage medium storing a program that causes a computer to execute the image processing method also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Example 1

A description will now be given of Example 1. The image processing apparatus according to this example has a function of acquiring polarization information from one or more captured images (first images) obtained by imaging via an image sensor in which a plurality of transmission polarization azimuths different from each other are settable (or which has a plurality of transmission polarization azimuths). The image processing apparatus also has a function of determining whether or not a luminance value acquired by the image sensor exceeds a predetermined threshold, and of calculating polarization information using the threshold determination result. The image processing apparatus also has a function of generating a combined image using the acquired polarization information.

Figure 1:
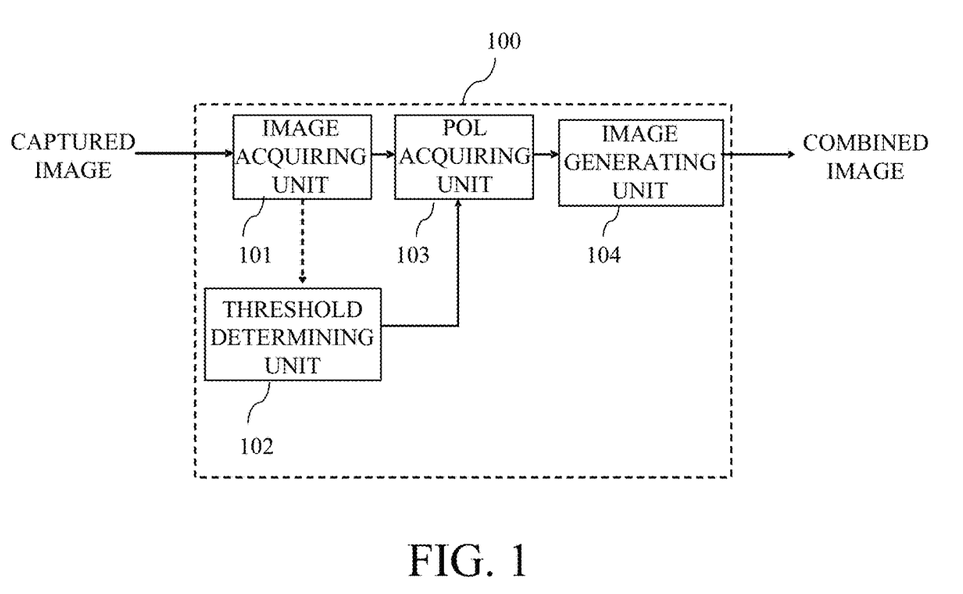
FIG. 1 is a block diagram of an image processing apparatus according to each embodiment.

Referring now to FIG. 1, a description will be given of an image processing apparatus 100 according to this example. FIG. 1 is a block diagram of the image processing apparatus 100. The image processing apparatus 100 includes an image acquiring unit (first acquiring unit) 101, a threshold determining unit 102, a polarization information acquiring unit (second acquiring unit) 103, and an image generating unit 104.

The image acquiring unit 101 acquires at least one captured image (first image) generated by imaging an object with an image pickup apparatus including an optical system, a polarization element, and an image sensor. That is, the image acquiring unit 101 acquires first image information by imaging using a polarization element capable of transmitting light having a plurality of polarization azimuths different from each other. In this example, the first image information includes a plurality of images respectively corresponding to lights with a plurality of polarization azimuths. The polarization element is an element for transmitting which lights with the plurality of polarization azimuths (transmission polarization azimuths) different from each other. The image processing apparatus 100 may be a device such as a personal computer separate from the image pickup apparatus, or may be installed in the image pickup apparatus as described below.

The threshold determining unit 102 determines whether or not the luminance data is higher than a predetermined threshold using a captured image acquired by the image acquiring unit 101, and generates a threshold determination result. That is, the threshold determining unit 102 determines whether or not the luminance of at least part of the first image information is higher than the threshold. The threshold determination result is information or information convertible to that information indicating whether or not the luminance data is higher than the predetermined threshold for each pixel or area (partial area of an image) of the captured image (at least part of the captured image).

The polarization information acquiring unit 103 acquires polarization information using the captured image acquired by the image acquiring unit 101 and the threshold determination result generated by the threshold determining unit 102. That is, the polarization information acquiring unit 103 acquires polarization information using the first image information and the determination result by the threshold determining unit 102. The polarization information will be described below.

Figure 2:
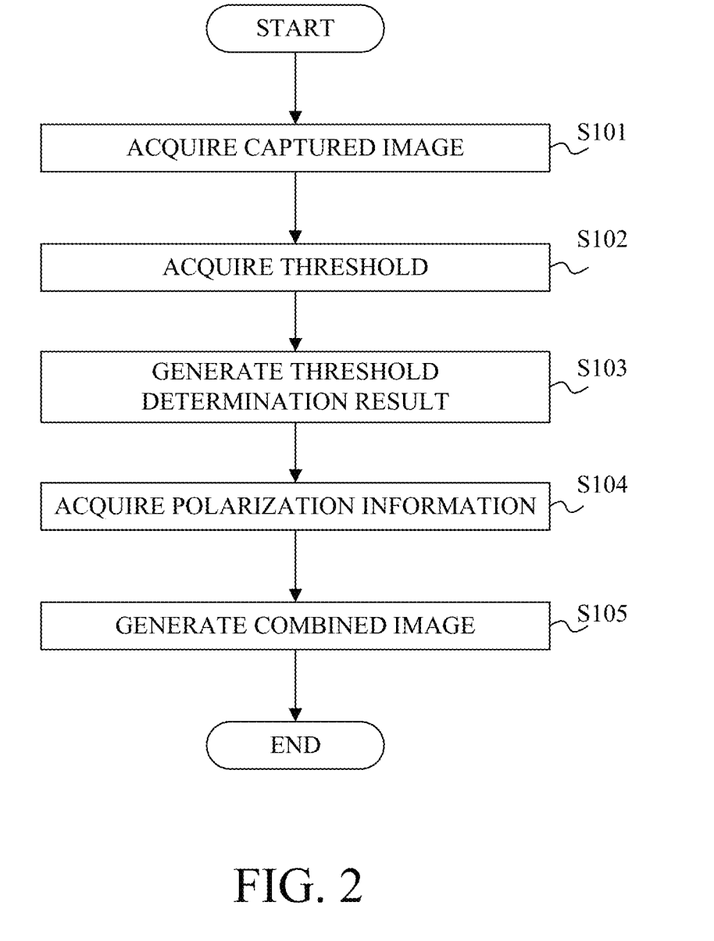
FIG. 2 is a flowchart illustrating an image processing method according to each embodiment.

Referring now to FIG. 2, a description will be given of the processing (image processing method) executed by each unit of the image processing apparatus 100. FIG. 2 is a flowchart illustrating an image processing method. Each step in FIG. 2 is executed by the image processing apparatus 100 as a computer according to a computer program.

First, in step S101, the image acquiring unit 101 acquires a plurality of captured images (first images) having transmission polarization azimuths different from each other, which are generated by imaging an object using the image pickup apparatus having the image sensor, as described above. In this example, the image sensor is a polarization element having a variable transmission polarization azimuth as a polarization azimuth of transmitting light. This polarization element is, for example, a polarizing plate rotatable about the optical axis of an optical system, or a variable retardation plate capable of changing a phase difference given to transmitting light as disclosed in Japanese Patent Laid-Open No. 2016-145924 and a polarization image sensor. The image pickup apparatus having the polarization element with the variable transmission polarization azimuth captures images a plurality of times in different transmission polarization azimuths of the polarization element, and generates a plurality of captured images having polarization information in the different transmission polarization azimuths.

The image sensor may be a plurality of polarizing plates arranged for each pixel of the image sensor and having different transmission polarization azimuths. That is, the image sensor may use a polarization image sensor having a polarizing plate for each pixel. In this case, the image pickup apparatus generates a single captured image (first image) including polarization information in a plurality of transmission polarization azimuths by single imaging with the polarization image sensor. The polarization element may be disposed between the object and the image sensor. More specifically, it may be disposed on the object side of the optical system (imaging optical system), inside the optical system, or between the optical system and the image sensor. A captured image may be of any format as long as it is image data, but may be a so-called RAW image that has not undergone processing such as compression or correction.

Next, in step S102, the threshold determining unit 102 acquires information on the threshold (predetermined threshold). Information about the threshold can be acquired, for example, by reading a threshold manually set by the user in the image pickup apparatus, or by reading through the image pickup apparatus a threshold generated from an imaging environment such as luminance, temperature, atmospheric pressure, color information of the object, object distance, or specifications of the image pickup apparatus. The threshold determining unit 102 may acquire information about the threshold by analyzing the captured image using a technology such as Deep Learning, or from another device such as a focus detecting apparatus that has been used for imaging or a control apparatus that controls the image pickup apparatus.

Next, in step S103, the threshold determining unit 102 generates a threshold determination result (threshold determination value) as to whether or not luminance data of each pixel in the captured image acquired by the image acquiring unit 101 is higher than the threshold (predetermined threshold). For example, the threshold determining unit 102 generates a threshold determination value S represented by the following equation (1):

$$S=(Ys-Yi)/Ym \tag{1}$$

where Yi is acquired luminance data, Ym is a maximum value of luminance data that can be acquired by the image sensor, and Ys is luminance data as a threshold.

In a case where the threshold determination value S is less than zero, the threshold determining unit 102 can determine that the acquired luminance data is higher than the threshold. However, as long as the threshold determining unit 102 can determine whether or not the acquired luminance data is higher than the threshold, an index other than the threshold determination value S may be used. For example, normalized luminance data acquired by dividing the acquired luminance data Yi by the maximum value Ym of luminance data that can be acquired by the image sensor and normalized may be used.

Next, in step S104, the polarization information acquiring unit 103 calculates (acquires) polarization information from the captured image using the captured image acquired by the image acquiring unit 101 and the threshold determination result generated by the threshold determining unit 102. More specifically, the polarization information acquiring unit 103 acquires a luminance change against a polarization azimuth change by extracting luminance data (signal value) of a specific pixel from each of a plurality of captured images having different transmission polarization azimuths, and by plotting the luminance data for each polarization azimuth.

Figure 3A:
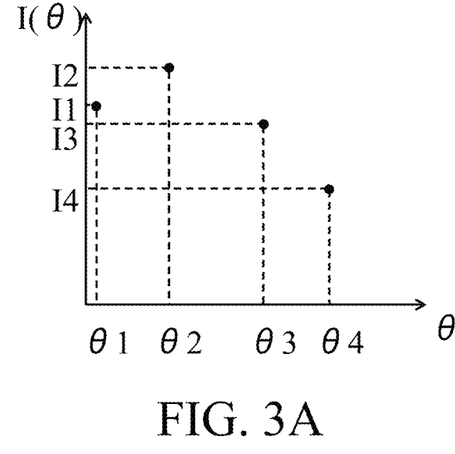
FIGS. 3A and 3B illustrate a relationship between luminance data of a pixel and a transmission polarization azimuth according to each example.
Figure 3B:
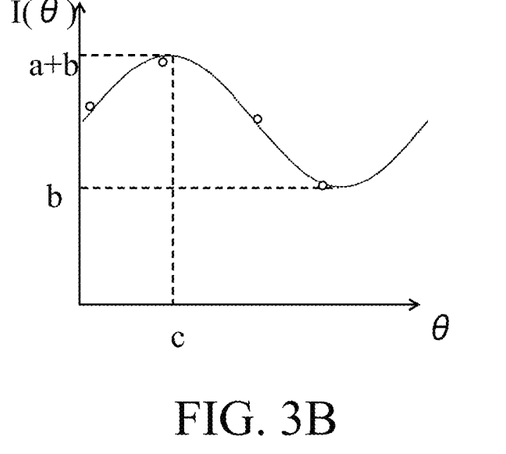

Referring now to FIGS. 3A and 3B, a description will be given of a relationship between luminance data of a pixel and polarization azimuth (transmission polarization azimuth). FIGS. 3A and 3B illustrate a relationship between the luminance data of the pixel and the transmission polarization azimuth. In FIGS. 3A and 3B, the horizontal axis indicates the transmission polarization azimuth $\theta$, and the vertical axis indicates the luminance I($\theta$). FIG. 3A illustrates an example that plots luminances I1 to I4 of specific pixels acquired from four captured images captured in four different transmission polarization azimuths $\theta$1 to $\theta$4 for each transmission polarization azimuth. FIG. 3B illustrates a result of fitting a change in luminance I($\theta$) against the transmission polarization azimuth $\theta$ from the plotted result of FIG. 3A using the following equation (2):

$$I(\theta)=a \times \cos^2(\theta-c)+b \tag{2}$$

In equation (2), a is a polarized light component in a specific image (luminance component that changes according to the polarization azimuth), b is a nonpolarized light component (constant luminance component regardless of the polarization azimuth), and c is a maximum transmission polarization azimuth that maximizes the polarized light component a.

As illustrated in FIGS. 3A and 3B, the luminance of the specific pixel changes like a cosine function as the polarization azimuth changes. Thus, the luminance change against the polarization azimuth change can be acquired by performing imaging in three or more states with transmission polarization azimuths different from each other and by acquiring the luminance. This example calculates (acquires) a, b, and c as polarization information in equation (2), which indicate the luminance change against the polarization azimuth change.

Before the polarization information is calculated, preprocessing may be performed on the captured image, as necessary. For example, in a case where there are a plurality of captured images, alignment may be performed such that the same object is relatively located at the same position between the captured images. In a case where a captured image uses a value obtained by gamma-processing the acquired luminance data or a relative position is moved by distortion correction, reverse processing may be performed as a preprocessing to reduce the influence of the image processing.

Next, in step S105 in FIG. 2, the image generation unit 104 generates an arbitrary combined image using the polarization information a, b, and c calculated by the polarization information acquiring unit 103. More specifically, for example, the image generation unit 104 generates the combined image by linearly summing the polarized light component a, the polarized light component $a \times \cos^2(\theta c-c)$ at a specific transmission polarization azimuth $\theta c$, and the nonpolarized light component b. The polarized light component contains many specular reflection components, and the nonpolarized light component contains many diffuse reflection components. Thus, generating a combined image by linear sum can arbitrarily adjust a ratio of the specular reflection component and the diffuse reflection component in the combined image.

Luminance Im of each pixel of the combined image is calculated by the addition equation represented by the following equation (3):

$$Im=k1 \times a \times \cos^{2 \times k2}\{k3(\theta c-c)\}+k4 \times a+k4 \times b \tag{3}$$

k1 to k5 in equation (3) are arbitrary constants (parameters), and common values may be set to them in all areas of the composite image, or different values may be set to them for each specific area or pixel.

Figure 4A:
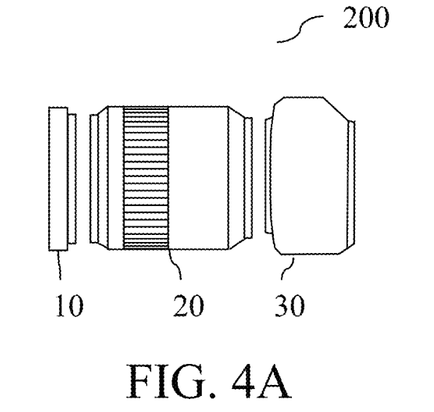
FIGS. 4A and 4B explain an image pickup apparatus according to each embodiment.

Referring now to FIGS. 4A and 4B, a description will be given of the image pickup apparatus according to this example. FIG. 4A is a configuration diagram of an image pickup apparatus 200 mounted with the image processing apparatus 100. The image pickup apparatus 200 includes a polarization element filter 10, a lens apparatus 20, and a camera body 30. The polarization element filter 10 includes the polarization element, and the lens apparatus 20 includes the optical system (imaging optical system). The camera body 30 includes the image sensor and the image processing apparatus 100. The polarization element filter 10 is attachable to and detachable from the lens apparatus 20, and the lens apparatus 20 is attachable to and detachable from the camera body 30.

Figure 4B:
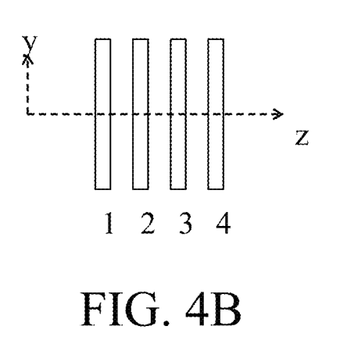

FIG. 4B is a configuration diagram of the polarization element included in the polarization element filter 10. As illustrated in FIG. 4B, the polarization element includes, in order from the object side to the image side, a quarter waveplate 1, a variable retardation plate 2, a polarizing plate 3, and a quarter waveplate 4. The slow axis or transmission axis of each element of the polarization element (quarter waveplate 1, variable retardation plate 2, polarizing plate 3, quarter waveplate 4) is arranged along the direction perpendicular to an optical axis z and tilted relative to each other to form 45 degrees between adjacent elements.

The variable retardation plate 2 includes VA liquid crystal, and a phase difference given to light rays passing through it can be controlled between 0 and a predetermined maximum value by changing the applied voltage. The polarization element filter 10 can variably control the transmission polarization azimuth by changing the phase difference given to the light rays by the variable retardation plate 2.

In this example, the image acquiring unit 101 acquires three or more captured images generated by imaging in a state in which the transmission polarization azimuths of the polarization elements in the polarization element filter 10 are different from each other. Here, as the maximum value of the phase difference of the variable retardation plate 2 increases, a setting range of the transmission polarization azimuth of the polarization element filter 10 increases. In order to improve the acquisition accuracy of the polarization information, the setting range of the transmission polarization azimuth may be 90 degrees or more, or 120 degrees or more, relative to the reference wavelength. When the period of the variable retardation plate 2 is considered, the setting range of the transmission polarization azimuth may be less than 180 degrees, or less than 150 degrees, relative to the reference wavelength. The reference wavelength can be arbitrarily set within the imaging wavelength range, for example, an intermediate wavelength, the minimum wavelength or the maximum wavelength of the imaging wavelength range, a wavelength that maximizes the sensitivity of the image pickup apparatus, etc., can be set according to the purpose.

In general, an image sensor has an upper limit of luminance data that can be output for each specific imaging condition. Where the upper limit luminance of the image sensor is the saturation luminance, the image sensor cannot acquire data higher than the saturation luminance. Therefore, in a case where the captured image contains saturation luminance data, it is difficult to correctly calculate the polarization information. In order to acquire the polarization information from object images having various polarization azimuths, captured images that do not include saturation luminance data may be acquired. In other words, an image may be captured near the transmission polarization azimuth in which the contribution of the polarized light component a becomes small. For example, many images may be captured by reducing a changing amount in the transmission polarization azimuth between captured images, but a data amount to be acquired becomes large, and it takes a long time to acquire many images.

Therefore, this example can easily acquire a captured image that does not include saturation luminance data using the wavelength dependence of the phase difference imparted to the light rays by the variable retardation plate. Since the refractive index of the liquid crystal material of the variable retardation plate illustrates different values depending on the wavelength, the phase difference illustrates different values depending on the wavelength of the transmitting light. Table 1 illustrates a refractive index no for an ordinary ray and a refractive index ne for an extraordinary ray of the liquid crystal material at each wavelength.

TABLE 1

| WAVELENGTH | ne | no |
|---|---|---|
| 470 | 1.597 | 1.491 |
| 530 | 1.588 | 1.486 |
| 600 | 1.580 | 1.481 |

The image sensor according to this example has RGB color channels (wavelength regions), and the wavelengths that maximize the transmitting light amount in each color channel are 470 nm, 530 nm, and 600 nm. In general, the maximum transmission polarization azimuth c does not change with the acquired wavelength. This is because the polarized light component a is mainly derived from the specular reflection component. That is, since the transmission polarization azimuth, in which the contribution of the polarized light component a is small, does not change with wavelength, a captured image having no saturation luminance data can be easily acquired by imaging with a small changing amount of the transmission polarization azimuth at different wavelengths. The transmission polarization azimuth in this example is set to zero degrees in a case where the phase difference imparted to the light rays by the variable retardation plate 2 is zero, and indicates a value of the transmission polarization azimuth that changes as the phase difference increases. Table 2 illustrates normalized luminance data IR, IG, and IB that are normalized by the maximum value of the luminance data that can be acquired by the polarization element in the transmission polarization azimuth [degree] of the polarization element at each wavelength [nm] and each color channel of RGB in acquiring three captured images.

TABLE 2

| | t600 | t530 | t470 | IR | IG | IB |
|---|---|---|---|---|---|---|
| CAPTURED IMAGE 1 | 2.4 | 2.7 | 3.2 | 0.620 | 0.773 | 0.550 |
| CAPTURED IMAGE 2 | 43.2 | 50.2 | 59.9 | 0.736 | 0.965 | 0.714 |
| CAPTURED IMAGE 3 | 102.2 | 118.5 | 140.4 | 0.904 | 1.000 | 0.664 |

In a case where t470 [degrees] and t600 [degrees] are transmission polarization azimuths of the polarization elements corresponding to lights with wavelengths of 470 nm and 600 nm, respectively, the following inequality (4) may be satisfied. Satisfying inequality (4) can easily acquire a captured image that does not contain saturation luminance data.

$$1.05 \leq t470/t600 \tag{4}$$

Inequality (4) relates to the wavelength dependence of the transmission polarization azimuth. The transmission polarization azimuth has a period of 180 degrees, and the luminance calculated by equation (2) has the same value. In a case where the wavelength dependence of the transmission polarization azimuth is not considered, the transmission polarization azimuth may be changed every (180/n) degrees in order to evenly acquire the data for one period in n captured images. For example, for three captured images, the transmission polarization azimuth may be set every 60 degrees. In a case where the transmission polarization azimuth has wavelength dependence, images can be captured with a small changing amount in the transmission polarization azimuth including at different wavelengths and it becomes easier to acquire captured images that contain no luminance saturation data at any wavelength.

In a case where the value becomes lower than the lower limit of inequality (4), the wavelength dependence of the transmission polarization azimuth becomes small, and the effect of reducing the changing amount in the transmission polarization azimuth, including different wavelengths, cannot be acquired. This example may set the lower limit of inequality (4) to 1.10, 1.15, 1.20, 1.24, 1.28, 1.32, 1.36, or 1.40 instead of 1.05. In a case where the numerical value on the right side of inequality (4) becomes too large, a changing amount in the transmission polarization azimuth between different wavelengths in specific captured images becomes too large, so it may be set to a value of 2.00 or less. This example may set the upper limit of inequality (4) to 1.90, 1.80, 1.70, 1.60, 1.55, 1.50, or 1.45 instead of 2.00. An absolute value of a difference between "t470" and "t600" in inequality (4) may be 5 degrees or more. The absolute value of this difference may be set to 10 degrees, 15 degrees, 20 degrees, 25 degrees, 30 degrees, 35 degrees, or 40 degrees.

The polarization information acquiring unit 103 acquires polarization information for each wavelength band based on data for a plurality of wavelength bands in the visible light region. The following inequality (5) may be satisfied:

$$dt \times n/180 \leq 0.95 \quad (5)$$

where n is the number of images included in the first image information (the number of captured images for acquiring polarization information), and dt [degree] is the maximum difference in the plurality of transmission polarization azimuths (absolute value of maximum changing amount).

Inequality (5) relates to the maximum changing amount in the transmission polarization azimuth in different captured images. Satisfying inequality (5) can reduce the changing amount in the transmission polarization azimuth including different wavelengths. In a case where the value becomes higher than the upper limit of inequality (5), the changing amount in the transmission polarization azimuth between captured images will become relatively large. In order to further ensure the effect of this example, the upper limit of inequality (5) may be set to 0.90, 0.85, 0.80, 0.75, 0.70, 0.65, 0.60, or 0.55 instead of 0.95.

In a case where luminance data as a threshold normalized by the maximum value Ym of the luminance data that can be acquired by the image sensor in this example is set to 0.98, it is determined that the acquired luminance data of the G channel of the captured image 3 is higher than the threshold. At this time, the polarization information represented by equation (2) can be calculated by using the maximum transmission polarization azimuth c calculated from another color channel and the luminance data of the G channel of the captured images 1 and 2. In a case where the maximum transmission polarization azimuth c can be calculated for a plurality of color channels, any value may be used, or an average value, a maximum value, a minimum value, or the like of a plurality of data may be used. In a case where the degree of polarization (DOP) defined by the following equation (6) is relatively high, the accuracy of acquiring polarization information tends to be high. Thus, the transmission polarization azimuth c at the color channel having the highest DOP may be employed:

$$DOP = a/(a+2b) \quad (6)$$

Figure 5:
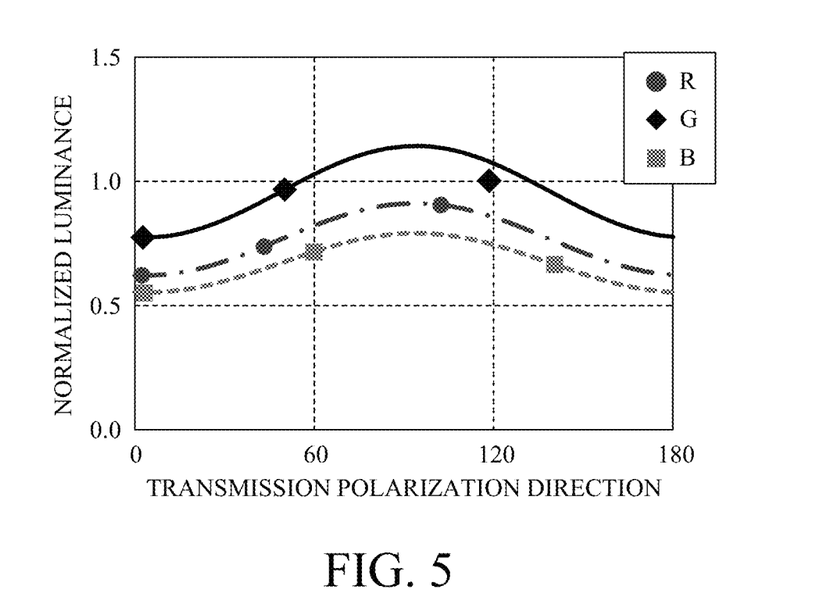
FIG. 5 illustrates a relationship between a transmission polarization azimuth and normalized luminance of each captured image in Example 1.

This example employs the maximum transmission polarization azimuth c calculated from the luminance data of the R channel for the polarization information of the G and B channels. FIG. 5 illustrates a relationship between the transmission polarization azimuth and the normalized luminance of each captured image (R, G, B) in this example. In FIG. 5, the horizontal axis indicates the transmission polarization azimuth, and the vertical axis indicates the normalized luminance. From FIG. 5, it is understood that polarization information can be acquired even in a case where luminance data higher than the threshold is included.

Example 2

A description will be given of Example 2. This example is different from Example 1 in calculating polarization information based on four captured images and one added image. In this example, steps S101 to S103 of the image processing method illustrated in FIG. 2 are the same as those of Example 1. The method of generating a combined image in step S105 is the same as that of Example 1.

In step 104, this example acquires an added image based on the threshold determination result, and calculates polarization information based on the luminance data of the captured image and the added image. Table 3 illustrates the transmission polarization azimuth and normalized luminance data for each wavelength in this example.

TABLE 3

|  | t600 | t530 | t470 | IR | IG | IB |
|---|---|---|---|---|---|---|
| CAPTURED IMAGE1 | 0.0 | 0.0 | 0.0 | 0.480 | 1.000 | 0.720 |
| CAPTURED IMAGE2 | 26.1 | 30.2 | 36.0 | 0.610 | 1.000 | 0.960 |
| CAPTURED IMAGE3 | 62.5 | 73.1 | 87.2 | 0.611 | 1.000 | 0.743 |
| CAPTURED IMAGE4 | 114.2 | 132.5 | 155.7 | 0.351 | 0.720 | 0.543 |
| ADDED IMAGE1 | 98.4 | 1142 | 135.2 | 0.433 | 0.805 | 0.485 |

Where the normalized threshold luminance in this example is set to 0.98, it is determined that the acquired luminance data of the G channel of captured images 1, 2, and 3 is higher than the threshold. At this time, an attempt to obtain the polarization information of the G channel represented by equation (2) using the luminance data of the captured images 1 to 4 cannot accurately find the polarization information since there is only one luminance data equal to or lower than the threshold. Accordingly, the polarization information of the G channel can be calculated by changing the phase difference given to the light rays by the variable retardation plate 2 to obtain an added image and by acquiring two luminance data equal to or lower than the threshold.

That is, in this example, in a case where the number of first images (captured images) whose luminance is determined to be equal to or lower than a predetermined threshold is one or less, the image acquiring unit 101 acquires a second image (captured image) that is obtained through imaging in a polarization azimuth different from that of the first image. Thereby, the total number of first images and second images whose luminance is determined to be equal to or lower than the predetermined threshold is two or more.

This example may set the transmission polarization azimuth in acquiring the added image between the captured image 4 for acquiring luminance data equal to or lower than the threshold and the captured image 1 or 3 for acquiring luminance data exceeding the threshold. This example employs the maximum transmission polarization azimuth c calculated from the luminance data of the R channel having the highest DOP.

Figure 6:
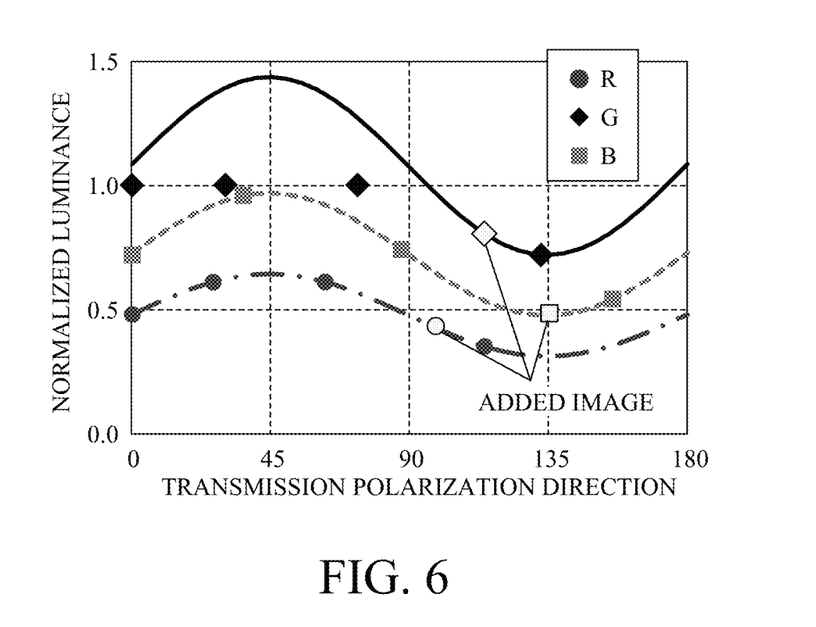
FIG. 6 illustrates a relationship between a transmission polarization azimuth and normalized luminance of each captured image in Example 2.

FIG. 6 illustrates a relationship between the transmission polarization azimuth and the normalized luminance of each captured image and added image in this example. In FIG. 6, the horizontal axis represents the transmission polarization azimuth, and the vertical axis represents the normalized luminance. From FIG. 6, it is understood that polarization information can be acquired even in a case where luminance data higher than the threshold is included.

Example 3

A description will now be given of Example 3. This example is different from Example 2 in calculating polarization information based on four captured images and two added images. Table 4 illustrates the transmission polarization azimuth and normalized luminance data for each wavelength in this example.

TABLE 4

|  | t600 | t530 | t470 | IR | IG | IB |
|---|---|---|---|---|---|---|
| CAPTURED IMAGE1 | 0.0 | 0.0 | 0.0 | 0.480 | 1.000 | 0.720 |
| CAPTURED IMAGE2 | 26.1 | 30.2 | 36.0 | 0.610 | 1.000 | 0.960 |
| CAPTURED IMAGE3 | 62.5 | 73.1 | 87.2 | 0.611 | 1.000 | 0.743 |
| CAPTURED IMAGE4 | 114.2 | 132.5 | 155.7 | 0.350 | 0.720 | 0.543 |
| ADDED IMAGE 1 | — | 114.3 | — | — | 0.805 | — |
| ADDED IMAGE 2 | — | 143.8 | — | — | 0.750 | — |

Where the normalized threshold luminance in this example is set to 0.98, it is determined that the acquired luminance data of the G channel of captured images 1, 2, and 3 is higher than the threshold. Accordingly, three luminance data higher than the threshold can be secured by acquiring added images in which the transmission polarization azimuths at a wavelength of 570 nm are 114.3 degrees and 143.8 degrees. In a case where there is luminance data higher than the threshold in a certain area of the transmission polarization azimuth, the number of luminance data equal to or lower than the threshold is increased to accurately calculate the polarization information by fitting with the least squares method, etc.

That is, in this example, in a case where the number of first images (captured images) whose luminance is determined to be equal to or lower than the predetermined threshold is 2 or less, the polarization information acquiring unit 103 acquires the first polarization information while the number of first images is set to 3 or more whose luminance is equal to or lower than the predetermined threshold. Then, the polarization information acquiring unit 103 acquires the second polarization information as polarization information acquired using the first polarization information.

The accuracy can be further improved by calculating a ratio of the polarized light component a of each color channel with the luminance data lower than the threshold, by estimating the luminance data in an area exceeding the threshold, and by calculating the polarization information including the estimated value. For example, in a case where the polarization information of the R channel is calculated from the luminance data of the captured images 1 to 4, the normalized luminance data of the R channel in the transmission polarization azimuth of the added image 1 is 0.349. Therefore, from the ratio of the polarized light component a of the G channel to the R channel, the normalized luminance data in the maximum transmitting polarization azimuth c of the G channel can be estimated to be 1.405. Thus, in this example, the polarization information acquiring unit 103 may obtain the second polarization information using the data regarding the polarized light component in the first polarization information.

Figure 7:
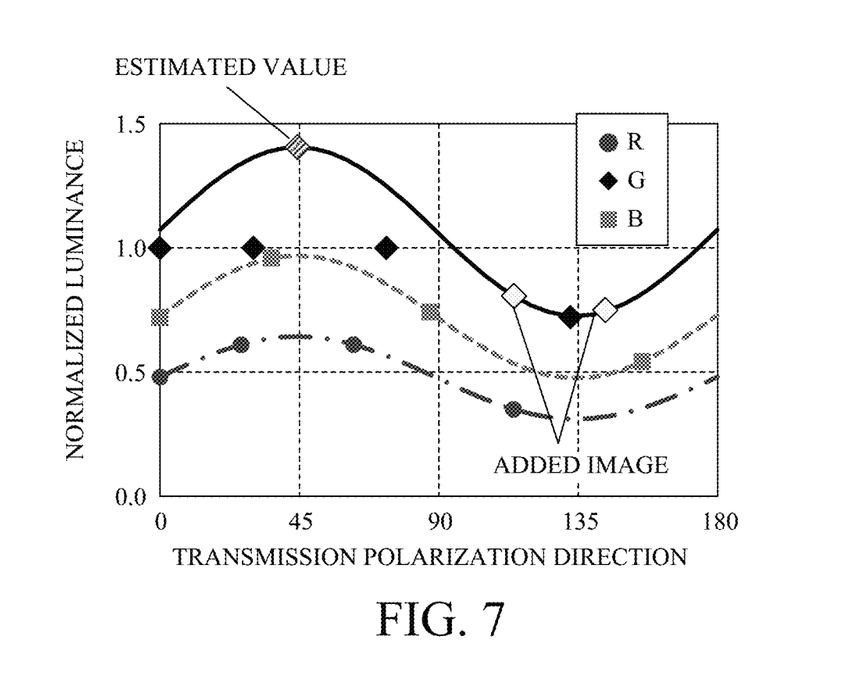
FIG. 7 illustrates a relationship between a transmission polarization azimuth and normalized luminance of each captured image in Example 3.

FIG. 7 illustrates a relationship between the transmission polarization azimuth and the normalized luminance of each captured image and added image in this example. In FIG. 7, the horizontal axis indicates the transmission polarization azimuth, and the vertical axis indicates the normalized luminance. From FIG. 7, it is understood that polarization information can be acquired even in a case where luminance data higher than the threshold is included.

Example 4

A description will now be given of Example 4. This example calculates polarization information based on four captured images. Table 5 illustrates the transmitting polarization azimuth and normalized luminance data for each wavelength in this example.

TABLE 5

|  | t600 | t530 | t470 | IR | IG | IB |
|---|---|---|---|---|---|---|
| CAPTURED IMAGE 1 | 0.0 | 0.0 | 0.0 | 0.550 | 1.000 | 1.000 |
| CAPTURED IMAGE 2 | 28.0 | 32.3 | 38.5 | 0.450 | 1.000 | 0.775 |
| CAPTURED IMAGE 3 | 66.5 | 77.8 | 92.9 | 0.423 | 1.000 | 0.840 |
| CAPTURED IMAGE 4 | 120.3 | 139.5 | 161.3 | 0.531 | 1.000 | 1.000 |

Where the normalized threshold luminance in this example is set to 0.90, it is determined that the acquired luminance data of the G channel of captured images 1, 2, 3, and 4 is higher than the threshold. At this time, since there is no luminance data equal to or lower than the threshold in the G channel, polarization information cannot be acquired. Since there are four luminance data equal to or lower than the threshold in the R channel, polarization information represented by equation (2) can be obtained, but in a case where the polarization component a can be calculated only with data in a specific wavelength band, a remarkable color will occur when an image is generated by extracting only the polarized light component. For example, this example can calculate the polarized light component a from the R and B channels, and thus an image generated by extracting only the polarized light component will have a magenta color, but this color may be significantly different from the polarized light component of the object.

Accordingly, in a case where it is determined that there is one or less luminance data equal to or lower than the threshold in the luminance data of any wavelength band, unnatural coloring of an image generated by extracting the polarized light component is suppressed by setting the polarized light component a of another wavelength band to a predetermined value. This example sets the polarized light component a in each RGB channel to zero. Even in an image generated by extracting only the nonpolarized light component, the nonpolarized light component b may be set to a predetermined value in order to make it close to the color of the nonpolarized light component of the object. That is, in this example, the polarization information acquiring unit 103 sets the intensities of the polarized light component and the nonpolarized light component of the polarization information to predetermined values in a case where it is determined that the luminance is higher than a predetermined threshold.

This example employs for the R and B channels, the nonpolarized light component b acquired by calculating the polarization information represented by equation (2) from the acquired luminance data. This example employs the luminance data of the captured image 1 for the G channel. As a value to be set for the nonpolarized light component b, the luminance data of the captured image with the smallest phase difference given to the light ray by the variable retardation plate may be set, or the maximum value, the minimum value, the average value etc. of the luminance data among a plurality of captured images may be set. A value calculated from the luminance data of the R channel is used for the maximum transmission polarization azimuth c.

Figure 8:
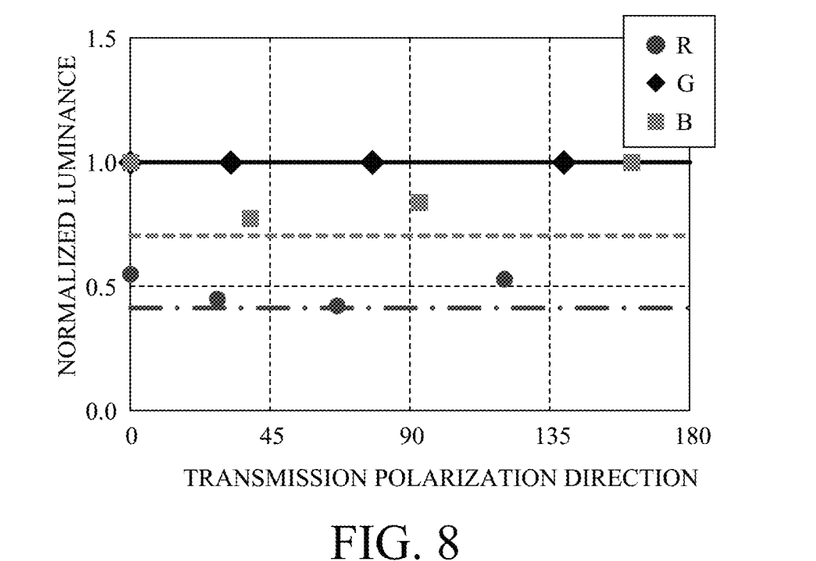
FIG. 8 illustrates a relationship between a transmission polarization azimuth and normalized luminance of each captured image in Example 4.

FIG. 8 illustrates a relationship between the transmission polarization azimuth and the normalized luminance of each captured image and added image in this example. In FIG. 8, the horizontal axis indicates the transmission polarization azimuth, and the vertical axis indicates the normalized luminance. From FIG. 8, it is understood that polarization information can be acquired even in a case where luminance data higher than the threshold is included.

Example 5

A description will now be given of Example 5. This example calculates polarization information based on four captured images. Table 6 illustrates the transmission polarization azimuth and normalized luminance data for each wavelength in this example.

TABLE 6

|  | t600 | t530 | t470 | IR | IG | IB |
|---|---|---|---|---|---|---|
| CAPTURED IMAGE 1 | 0.0 | 0.0 | 0.0 | 1.000 | 1.000 | 0.885 |
| CAPTURED IMAGE 2 | 17.5 | 20.2 | 24.0 | 1.000 | 1.000 | 0.708 |
| CAPTURED IMAGE 3 | 40.2 | 46.7 | 55.6 | 1.000 | 1.000 | 0.625 |
| CAPTURED IMAGE 4 | 72.4 | 84.9 | 101.3 | 1.000 | 1.000 | 0.892 |

Where the normalized threshold luminance in this example is set to 0.90, it is determined that the acquired luminance data of the R and G channels of the captured images 1, 2, 3, and 4 are higher than the threshold, and the polarization information cannot be acquired. Polarization information can be determined in the B channel, but the polarized light component a is set to zero in any of color channels so that no significant coloring is produced in generating an image by extracting only the polarized light component. At this time, the luminance data of the captured image 1 in which the variable retardation plate gives the smallest phase difference to light rays is set as the nonpolarized light component b. Thereby, coloring of the captured image caused by the wavelength dependence in the transmission polarization azimuth can be suppressed, and coloring that occurs when an image is generated by extracting only the nonpolarized light component can be suppressed. A value calculated from the luminance data of the B channel is used as the maximum transmission polarization azimuth c.

Figure 9:
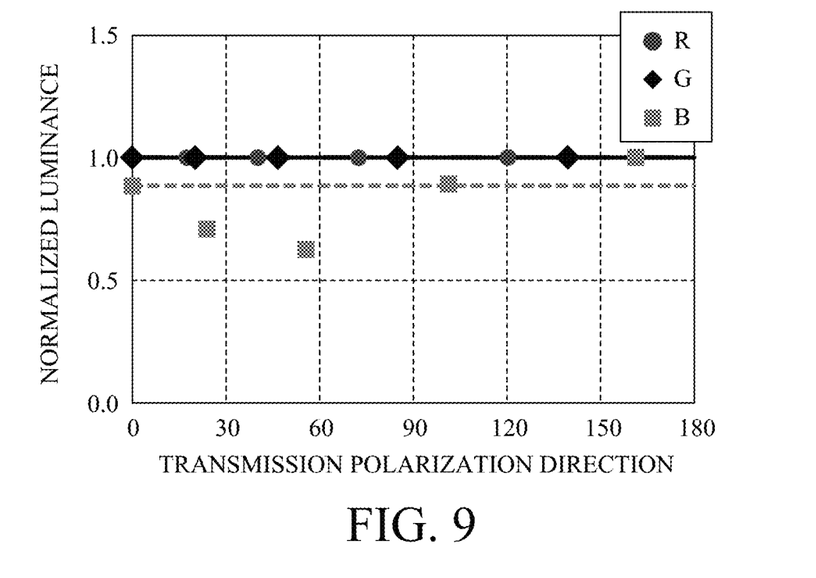
FIG. 9 illustrates a relationship between a transmission polarization azimuth and normalized luminance of each captured image in Example 5.

FIG. 9 illustrates a relationship between the transmission polarization azimuth and the normalized luminance of each captured image and added image in this example. In FIG. 9, the horizontal axis indicates the transmission polarization azimuth, and the vertical axis indicates the normalized luminance. From FIG. 9, it is understood that polarization information can be acquired even in a case where luminance data higher than the threshold is included.

Example 6

A description will now be given of Example 6. This example acquires polarization information from three captured images and one underexposed image. Table 7 illustrates the transmission polarization azimuth and normalized luminance data for each wavelength in this example.

TABLE 7

|  | t600 | t530 | t470 | IR | IG | IB |
|---|---|---|---|---|---|---|
| CAPTURED IMAGE 1 | 2.4 | 2.7 | 3.2 | 0.718 | 1.000 | 1.000 |
| CAPTURED IMAGE 2 | 49.0 | 57.1 | 68.1 | 0.726 | 1.000 | 0.776 |
| CAPTURED IMAGE 3 | 106.8 | 123.9 | 146.9 | 0.212 | 0.302 | 0.502 |
| UDREX IMAGE | 2.4 | 2.7 | 3.2 | 0.359 | 0.632 | 0.524 |

Where the normalized threshold luminance in this example is set to 0.95, there is only one luminance datum equal to or lower than the threshold in the G channel, so polarization information cannot be accurately acquired. Accordingly, the polarization information is calculated in the same transmission polarization azimuth as that of captured image 1 by reducing a light amount reaching the image sensor, by capturing an underexposed image for acquiring luminance data equal to or lower than a threshold, and by estimating the luminance data of the captured image 1 from the imaging condition.

In the underexposed image in this example, a light amount reaching the image sensor is halved for the captured image 1. That is, the normalized luminance data of the G and B channels in the captured image 1 can be estimated to be 1.264 and 1.049, respectively. Thereby, since there are three data equal to or lower than the threshold for the R and B channels, the polarization information can be calculated. Using the maximum transmission polarization azimuth c of the R channel and two luminance data equal to or lower than the threshold of the G channel can calculate the polarization information of the G channel.

Figure 10:
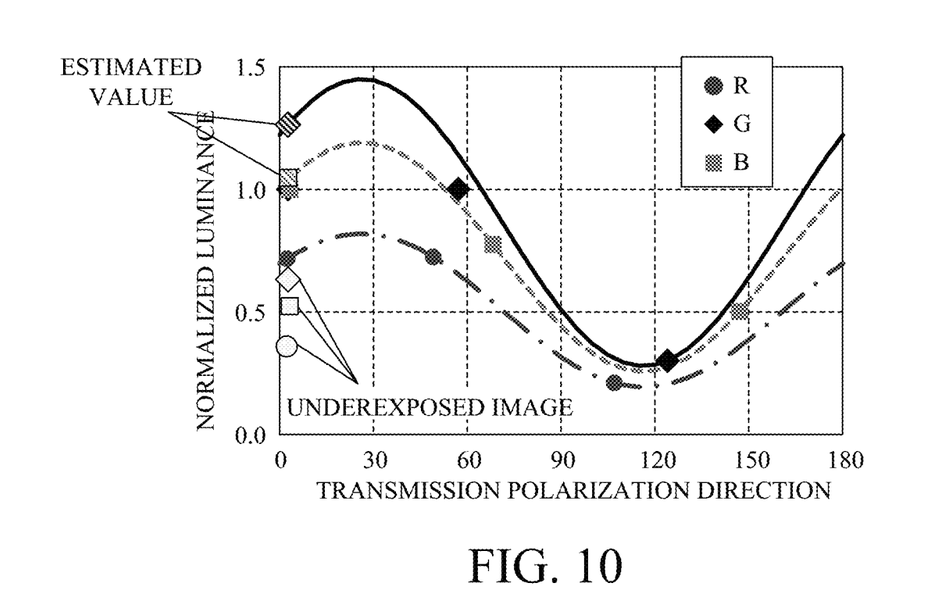
FIG. 10 illustrates a relationship between a transmission polarization azimuth and normalized luminance of each captured image in Example 6.

FIG. 10 illustrates a relationship between the transmission polarization azimuth and normalized luminance of each captured image and added image in this example. In FIG. 10, the horizontal axis indicates the transmission polarization azimuth, and the vertical axis indicates the normalized luminance. From FIG. 10, it is understood that polarization information can be acquired even in a case where luminance data higher than the threshold is included.

In this example, a method for reducing the light amount reaching the image sensor may change the shutter speed, the aperture diameter of the aperture stop, or the ISO speed of the image sensor. Alternatively, the light amount may be reduced by using a light amount reducing method such as an ND filter, by adjusting the light amount of the illumination light source, or the like. In this example, the transmission polarization azimuth of the underexposed image is the same as that of the captured image 1, but it may be captured with a different transmission polarization azimuth. In imaging with a plurality of transmission polarization azimuths, a high dynamic range combination (HDR combination) image may be generated from a plurality of images with different imaging exposures, and polarization information may be calculated from the HDR combined image.

Table 8 illustrates various numerical values corresponding to each example.

TABLE 8

|  | EX 1 | EX 2 | EX 3 | EX 4 | EX 5 | EX 6 |
|---|---|---|---|---|---|---|
| t470 | 140.4 | 155.7 | 155.7 | 161.3 | 161.3 | 146.9 |
| t600 | 102.2 | 114.2 | 114.2 | 120.3 | 120.3 | 106.8 |
| t470/t600 | 1.373 | 1.364 | 1.364 | 1.341 | 1.341 | 1.376 |
| dt | 42.4 | 26.9 | 26.9 | 28.0 | 19.0 | 45.8 |
| n | 3 | 4 | 4 | 4 | 5 | 3 |
| dt/180 × n | 0.706 | 0.598 | 0.598 | 0.622 | 0.528 | 0.763 |
| aR | 0.290 | 0.332 | 0.333 | 0.000 | 0.000 | 0.625 |
| bR | 0.620 | 0.311 | 0.310 | 0.413 | 1.000 | 0.195 |
| aG | 0.368 | 0.717 | 0.693 | 0.000 | 0.000 | 1.169 |
| bG | 0.773 | 0.719 | 0.725 | 1.000 | 1.000 | 0.281 |
| aB | 0.239 | 0.493 | 0.493 | 0.000 | 0.000 | 0.932 |
| bB | 0.550 | 0.476 | 0.476 | 0.705 | 0.885 | 0.259 |
| c | 93.9 | 44.5 | 44.4 | 150.9 | 140.2 | 140.2 |
| DOPR | 0.242 | 0.340 | 0.341 | — | — | 0.432 |
| DOPG | 0.244 | 0.333 | 0.328 | — | — | 0.446 |
| DOPB | 0.233 | 0.337 | 0.337 | — | — | 0.439 |

Each example has discussed the calculation of the polarization information based on the threshold determination result for the luminance data in the specific pixel of the captured image, but may determine a threshold for a plurality of pixels or a specific area in a captured image.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an image processing apparatus that can acquire polarization information even in a case where luminance data higher than a threshold is included.

This application claims the benefit of Japanese Patent Application No. 2022-176343, filed on Nov. 2, 2022, which is hereby incorporated by reference herein in its entirety.

What is claimed is:

1. An image processing apparatus comprising:
a memory storing instructions; and
a processor configured to execute the instructions to:
acquire first image information acquired by imaging using a polarization element configured to transmit lights with a plurality of polarization azimuths that are different from each other,
determine whether a luminance of at least part of the first image information becomes higher than a threshold, and
acquire polarization information using the first image information and a determination result,
wherein the following inequality is satisfied:

$$1.05 \leq t470/t600$$

where t470 [degrees] and t600 [degrees] are polarization azimuths of the polarization element corresponding to light with a wavelength of 470 nm and light with a wavelength of 600 nm, respectively.

2. The image processing apparatus according to claim 1, wherein the first image information includes a plurality of images respectively corresponding to the lights in the plurality of polarization azimuths, and
wherein the following inequality is satisfied:

$$dt \times n/180 \leq 0.95$$

where n is the number of the plurality of images and dt (degrees) is a maximum difference of the plurality of polarization azimuths.

3. The image processing apparatus according to claim 1, wherein the first image information includes a plurality of images respectively corresponding to the lights of the plurality of polarization azimuths,
wherein the processor acquires, among the plurality of images, in a case where the number of first images whose luminance is determined to be equal to or lower than a threshold is 1 or less, a second image obtained by imaging in a polarization azimuth different from that of the first image, and
wherein a total number of the first images and the second images whose luminance is determined to be equal to or lower than the threshold is two or more.

4. The image processing apparatus according to claim 1, wherein the first image information includes a plurality of images respectively corresponding to the lights of the plurality of polarization azimuths, and
wherein the processor acquires, among the plurality of images, in a case where the number of first images in which the luminance is determined to be equal to or lower than a threshold is 2 or less, first polarization information by determining the number of the first images whose luminance is determined to be equal to or lower than the threshold is 3 or more, and acquires second polarization information as the polarization information using the first polarization information.

5. The image processing apparatus according to claim 4, wherein the processor acquires the second polarization information using data on a polarized light component in the first polarization information.

6. An image processing apparatus comprising:
a memory storing instructions; and
a processor configured to execute the instructions to:
acquire first image information acquired by imaging using a polarization element configured to transmit lights with a plurality of polarization azimuths that are different from each other,
determine whether a luminance of at least part of the first image information becomes higher than a threshold, and
acquire polarization information using the first image information and a determination result, and in a case where it is determined that the luminance is higher than the threshold, set the intensities of a polarized light component and a nonpolarized light component of the polarization information to predetermined values.

7. The image processing apparatus according to claim 6, wherein the following inequality is satisfied:

$$1.05 \leq t470/t600$$

where t470 [degrees] and t600 [degrees] are polarization azimuths of the polarization element corresponding to light with a wavelength of 470 nm and light with a wavelength of 600 nm, respectively.

8. The image processing apparatus according to claim 6, wherein the first image information includes a plurality of images respectively corresponding to the lights in the plurality of polarization azimuths, and
wherein the following inequality is satisfied:

$$dt \times n/180 \leq 0.95$$

where n is the number of the plurality of images and dt (degrees) is a maximum difference of the plurality of polarization azimuths.

9. An image processing apparatus comprising:
a memory storing instructions; and
a processor configured to execute the instructions to:
acquire first image information acquired by imaging using a polarization element configured to transmit lights with a plurality of polarization azimuths that are different from each other,
determine whether a luminance of at least part of the first image information becomes higher than a threshold, and
acquire polarization information using the first image information and a determination result, and in a case where it is determined that the luminance of a first image included in the first image information is higher than the threshold, acquire the polarization information from the first image and a third image acquired by imaging under an imaging condition different from that of the first image.

10. The image processing apparatus according to claim 9, wherein the following inequality is satisfied:

$$1.05 \leq t470/t600$$

where t470 [degrees] and t600 [degrees] are polarization azimuths of the polarization element corresponding to light with a wavelength of 470 nm and light with a wavelength of 600 nm, respectively.

11. The image processing apparatus according to claim 9, wherein the first image information includes a plurality of images respectively corresponding to the lights in the plurality of polarization azimuths, and
wherein the following inequality is satisfied:

$$dt \times n/180 \leq 0.95$$

where n is the number of the plurality of images and dt (degrees) is a maximum difference of the plurality of polarization azimuths.

12. An image pickup apparatus comprising:
the image processing apparatus according to claim 1;
an image sensor.

13. The image pickup apparatus according to claim 12, further comprising an optical system and a polarization element.

14. The image pickup apparatus according to claim 13, wherein the polarization element can be set to change a polarization azimuth for transmitting light, and the processor acquires as the first image information a plurality of images obtained by a plurality of times of imaging in the plurality of polarization azimuths.

15. The image pickup apparatus according to claim 13, wherein the polarization element transmits lights with a plurality of polarization azimuths different from each other for each area, and the processor acquires a single image acquired by single imaging as the first image information.

16. An image processing method comprising:
acquiring first image information acquired by imaging using a polarization element configured to transmit lights with a plurality of polarization azimuths that are different from each other,
determining whether a luminance of at least part of the first image information becomes higher than a threshold, and
acquiring polarization information using the first image information and a determination result,
wherein the following inequality is satisfied:

$$1.05 \leq t470/t600$$

where t470 [degrees] and t600 [degrees] are polarization azimuths of the polarization element corresponding to light with a wavelength of 470 nm and light with a wavelength of 600 nm, respectively.

17. A non-transitory computer-readable storage medium storing a program that causes a computer to execute the image processing method according to claim 16.

* * * * *